United States Patent
Siri

(10) Patent No.: US 7,964,991 B2
(45) Date of Patent: Jun. 21, 2011

(54) CONVERTER CHANNELIZED UNIFORM POWER DISTRIBUTION SYSTEM

(75) Inventor: Kasemsan Siri, Torrance, CA (US)

(73) Assignee: The Aerospace Corporation, El Segundo, CA (US)

(*) Notice: Subject to any disclaimer, the term of this patent is extended or adjusted under 35 U.S.C. 154(b) by 366 days.

(21) Appl. No.: 12/378,857

(22) Filed: Feb. 20, 2009

(65) Prior Publication Data

US 2010/0213767 A1 Aug. 26, 2010

(51) Int. Cl.
*H02J 7/34* (2006.01)
(52) U.S. Cl. ......................................................... 307/53
(58) Field of Classification Search .................... 307/52, 307/53, 64–66; 363/13–21.01
See application file for complete search history.

(56) References Cited

U.S. PATENT DOCUMENTS

| | | | | |
|---|---|---|---|---|
| 4,114,048 A | * | 9/1978 | Hull et al. | 307/53 |
| 4,558,230 A | * | 12/1985 | Western | 307/66 |
| 6,137,274 A | * | 10/2000 | Rajagopalan | 323/272 |
| 6,525,435 B2 | * | 2/2003 | Lau et al. | 307/52 |
| 7,516,029 B2 | * | 4/2009 | Kim et al. | 702/69 |
| 7,589,511 B2 | * | 9/2009 | Dong et al. | 323/285 |

* cited by examiner

*Primary Examiner* — Albert W Paladini

(57) ABSTRACT

A channelized uniform distribution power system controls individual channels of power converters with each channel of power converters having uniform output power as the channels are controlled by voltage control signals from respective controllers that are interconnected by a shared current signal and a shared voltage signal for controlling the channels to provide uniform power, with conventional current limiting and voltage regulation functions. Each channel may have a number of converters being parallel-input parallel-output connected converters, series input parallel-output connected converters, and parallel-input series output connected converters.

18 Claims, 5 Drawing Sheets

SERIES CONNECTED CONVERTER UNIFORM OUTPUT CURRENT SHARING CHANNELIZED UNIFORM POWER DISTRIBUTION SYSTEM

PARALLEL INPUT CONNECTED SERIAL OUTPUT
CONNECTED CONVERTER POWER SYSTEM

SERIAL INPUT CONNECTED PARALLEL OUTPUT
CONNECTED CONVERTER POWER SYSTEM

SERIES CONNECTED CONVERTER UNIFORM OUTPUT
CURRENT SHARING CHANNELIZED UNIFORM POWER DISTRIBUTION
SYSTEM

PARALLEL CONNECTED CURRENT MODE CONVERTER UNIFORM
OUTPUT CURRENT SHARING CHANNELIZED UNIFORM POWER
DISTRUTION SYSTEM

US 7,964,991 B2

CONVERTER CHANNELIZED UNIFORM POWER DISTRIBUTION SYSTEM

STATEMENT OF GOVERNMENT INTEREST

The invention was made with Government support under contract No. FA8802-04-C-0001 by the Department of the Air Force. The Government has certain rights in the invention.

REFERENCE TO RELATED APPLICATION

The present application is related to applicant's copending application entitled Uniform Converter Input Voltage Distribution Power System Ser. No. 11/713,826, filed Feb. 21, 2007, publication number 20080197825 published Aug. 21, 2008, by the same inventor.

FIELD OF THE INVENTION

The invention relates to the field of power system. More particularly the present invention relates to a power system for uniform power distribution among multiple channels each having a plurality of power converters.

BACKGROUND OF THE INVENTION

U.S. Pat. No. 6,009,000 issued Dec. 28, 1999 to Kasemsan Siri, referred to as Siri000, entitled Shared-Bus Current Sharing Parallel Connected Current-Mode DC to DC Converters, here incorporated by reference, teaches a power system consisting of parallel connected current-mode power converters combined with a voltage error signal on a shared-bus used in common for controlling all of the power stages for improved consistency, reliability, and performance in both transient and steady states. Near uniform current sharing is achievable without sacrificing the voltage regulation performance. The improved system offers faster settling time under step loads, consistent small signal characteristics, and large signal responses regardless of mismatches of component values such as reference voltages, and reduced output impedance variations in magnitude and phase even during various modes of operation.

Referring to FIGS. 3 and 5 of prior art Siri000, the current error amplifier $91a$ or $91b$ can be used for current limiting operation, including a current reference IREF $92a$ (or $92b$), a current sensing signal ISense using a current sensing resistor 79, and a pull down diode $90a$ (or $90b$) for pulling down (or pushing up) a voltage control signal VC. The voltage error amplifier $84a$ (or $84b$) can be used for voltage regulation using the output voltage VLoad to a load and using a reference voltage VREF $85a$ (or $85b$) and a pull down diode $86a$ (or a push up diode $86b$) for pulling down (or pushing up) the voltage control signal VC. Current limiting and voltage regulation are well known functions that have been integrated into multiple converter power systems.

U.S. Pat. No. 7,151,362 issued Dec. 19, 2006 to Kasemsan Siri, referred to as Siri362, entitled Uniform Converter Output Voltage Distribution Power System, here incorporated by reference, teaches a uniform converter output voltage distribution power system evenly controls the individual output voltages of DC-to-DC parallel-input series-output connected converters using a uniform output voltage distribution controller including a generator for generating respective error signals from the converter output voltages using a common distribution reference signal for providing respective converter control signals connected to the converters through respective shared-bus controls for evenly distributing the power delivered by the converters that are shared-bus current-mode converters for preferably providing high output voltages. Employing a common regulation control signal, the controller can also provide system output voltage regulation, system input current limiting, proportional-voltage control, relaxed voltage uniformity, and fault-tolerant power control.

Referring to prior art FIG. 1 herein, as an example of the power system shown in FIG. 1 of Siri362, a parallel-input connected serial-output connected converter power system has an input voltage Vin1 that is fed through line impedance ZinSI for providing input currents Ii1, Ii2, and Ii3 respectively to first, second, and third DC to DC power converters having three voltage outputs Vo1, Vo2, and Vo3 that are serially connected together providing three serial-output voltages V1, V2, and V3 where the first serial-output voltage V1 serves as the output voltage V0 that is applied across a bus stabilizer BS and a load capacitor C. A power-return node of the system output voltage can be designated as an ISEN signal, which is the voltage sensed across a current-sense resistor being inserted between the load ground and the power-return node of the power system output voltage. The power system include three diodes D1, D2, and D3 for respectively connecting three voltage controls VC1, VC2, and VC3 to share bus inputs SB1, SB2, and SB3 of the first, second, and third DC to DC power converters for providing distributed power sharing among the first, second, and third DC to DC power converters.

The parallel-input connected serial-output connected converter power system of Siri362 uses a generalized uniform output voltage distribution controller shown in FIGS. 1 and 2A of Siri362. The uniform output voltage distribution controller includes a uniform voltage distribution controller 74 providing N named error voltages Vd1, Vd2, through VdN for any N number of converters. N summers 76, 78, through 80 respectively sum a control voltage VC with the N named error voltages Vd1, Vd2, through VdN for providing N respective voltage control signals Vc1, Vc2, through VcN. The control voltages Vc1, Vc2, through VcN or particularly Vc3 for N=3, are connected through respective diodes and to share bus input SB1, SB2, and SB3 of the three DC to DC power converters #1, #2, and #3. The use of a uniform output voltage distribution controller for controlling respective converters to achieve a uniform output voltage distribution is known.

Related U.S. patent application Ser. No. 11/713,826, filed Feb. 21, 2007, publication number 20080197825, referred to as Siri825, published Aug. 21, 2008, entitled "Uniform Converter Input Voltage Distribution Power System", being prior art to the present application, teaches a uniform converter input voltage distribution power system evenly controls the individual input voltages of DC-to-DC series-input parallel-output connected converters using a uniform input voltage distribution controller including a generator for generating respective error signals from the converter input voltages using a common distribution reference signal for providing respective converter control signals connected to the converters through respective shared-bus controls for evenly distributing the power delivered by the converters that are shared-bus current-mode converters for preferably providing a low output voltage. Employing a common regulation control signal, the controller can also provide system output voltage regulation, system input current limiting, proportional-voltage control, relaxed voltage uniformity, and fault-tolerant power control.

Referring to prior art FIG. 2 herein, as an example of the power system shown in FIG. 1 of Siri825, a serial-input connected parallel-output converter power system including three DC to DC converters having a parallel connected output provide an output voltage V0 driving a bus stabilizer BS, and output capacitance C. An input voltage Vin1 is communicated through line impedance ZinP1. The input voltage is realized by serially connecting serial-input voltages V1, V2, and V3 respectively with respect to ground using series-connected input capacitors Cin1, Cin2, Cin3 having respective converter input voltages of Vi1, Vi2, and Vi3. The converter input voltages are fed to the three converters #1, #2, and #3, respectively. Three voltage control signals VC1, VC2, and VC3 are respectively fed through resistors R1, R2, and R3 through three respective optocouplers that are respectively coupled to share bus inputs SB1, SB2, and SB3 of the three converters #1, #2, and #3, for controlling the power output of the converters #1, #2, and #3. The optocouplers have their optoinput circuits being biased in common by a bias voltage VCC with respect to ground GND whereas their two-terminal optocontrolled isolated outputs being connected to their respective share bus inputs and their respective converter-input power-returns. This converter power system enables uniform power distribution between the converters #1, #2, and #3 as they are respectively controlled by the voltage control signals VC1, VC2, and VC3.

The prior art teaches voltage regulation, current limiting, and share bus input control of a bank of converters for uniform power distribution between the converters in a uniform power distribution system. These systems teach expanding the number of converters within the same bank to provide sufficient power to a load. Contrary to the teachings of the prior art, these uniform-power distribution power systems could be replicated to provide an increased amount of power to a load as desired through use of two or more banks of converters, each of which having its own dedicated input power source for an independently-sourced converter power system or sharing a common input power source for a single-source converter power system. Each of the banks of converters could be considered a power channel.

As such, a hypothecated nonprior art channelized power system could have a plurality of converter channels with power distribution perfected, according to the teachings of the prior art, within each of the channels. Such a channelized power system would lack active current-sharing among the existing channel output currents, leading to far from uniform current-sharing among nearly identical paralleled channels of the series-connected converters with their channel outputs being shared by a common load. Such a hypothecated nonprior art channelized power system would have unreliable output voltage regulation, during both in steady state and transient conditions, because there exist inherent control conflicts among the individual output voltage regulation circuits individually distributed within each the hypothecated channels of the series-connected converters. Such a hypothecated nonprior art channelized power system would have nonuniform power flows among multiple channels of series connected converters leading to unequal utilization, consequently degrading the system reliability. Such a hypothecated nonprior art channelized power system would have undesirable interactions among series connected converters, because of a natural tendency toward nonuniform distribution of series-connected converter voltages, leading to complicated stability design and analysis due to different modes of operation among series connected converters, each of which is not properly controlled under dedicated voltage regulation control. These and other disadvantages are solved or reduced by using the invention.

SUMMARY OF THE INVENTION

An object of the invention is to provide a channelized power system having channels, each of which having power converters.

Another object of the invention is to provide a channelized uniform power distribution power system having channels, each of which having power converters, where power is uniform among the channels.

Yet another object of the invention is to provide channelized uniform power distribution power system having channels, each of which having power converters, where power is uniformly distributed among the channels and among the converters within each channel.

Still another object of the invention is to provide a channelized uniform power distribution power system having channels, each of which having power converters, where power is uniformly distributed among the channels and among the converters within each channel, with the channels being controlled by controllers having an interconnecting share bus signal.

A further object of the invention is to provide a channelized uniform power distribution power system having channels, each of which having power converters, where power is uniformly distributed among the channels and among the converters within each channel, with the channels being controlled by controllers having an interconnecting share bus voltage signal and an interconnecting share bus current signal.

The present invention is characterized by a channelized power system having a plurality of channels, with each of the channels containing power converters and respective channel controllers for controlling the power provided by the channels. The controllers are interconnected so that the controllers uniformly control the channels and the converters within each channel. Each channel includes a bank of converters. A shared bus voltage signal and a shared bus current signal interconnect the controllers together for uniform control of the channels for providing uniform power distribution. The channelized power system has controls that are expandable for one or more input power sources and for adding channels as desired. The channelized power system also distributes power sources that independently supply input voltages to respective channels of series connected converters.

The controllers serve several control purposes perfected by using the shared bus signals for uniform channel output current sharing and uniform series voltage distribution while providing system controls such as current limiting and voltage regulation of either the output or input voltages. The channelized power system offers modularity of DC to DC converters facilitating higher power expansion, with lower or higher output voltages. The controllers stabilize interactions among interconnected channels and converters because the channels and converters are controlled by the common shared bus signals for reducing imbalance in power flows among either parallel connected or independently sourced power channels of series connected converters that share the same load. The channelized power system offers fault tolerance among series connected converters that actively sustain uniform series connected voltages among the remaining converters that still function even though one converter or more may fail to function by inability of building up their serial voltages in any of multiple power channels of series connected converters that share the same common load. These and other advantages will become more apparent from the following detailed description of the preferred embodiment.

DETAILED DESCRIPTION OF THE PREFERRED EMBODIMENT

Figure 1:
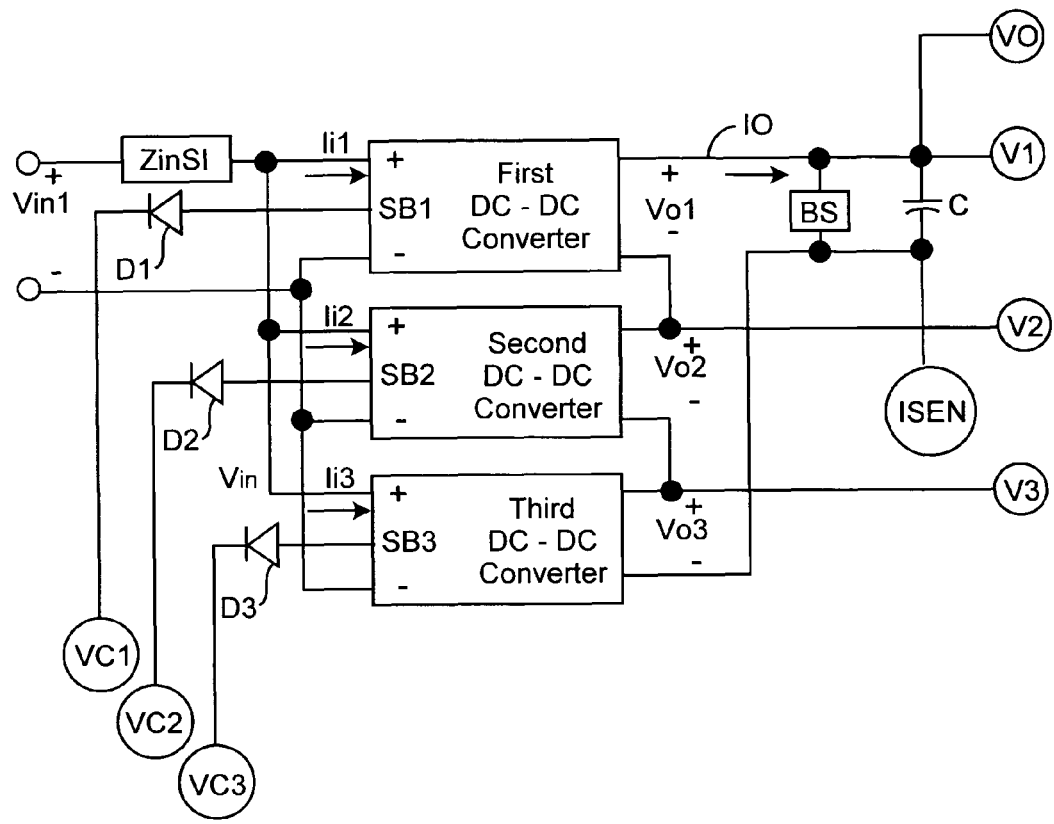
FIG. 1 is a block diagram of a prior art parallel-input connected serial-output connected converter power system.
Figure 2:
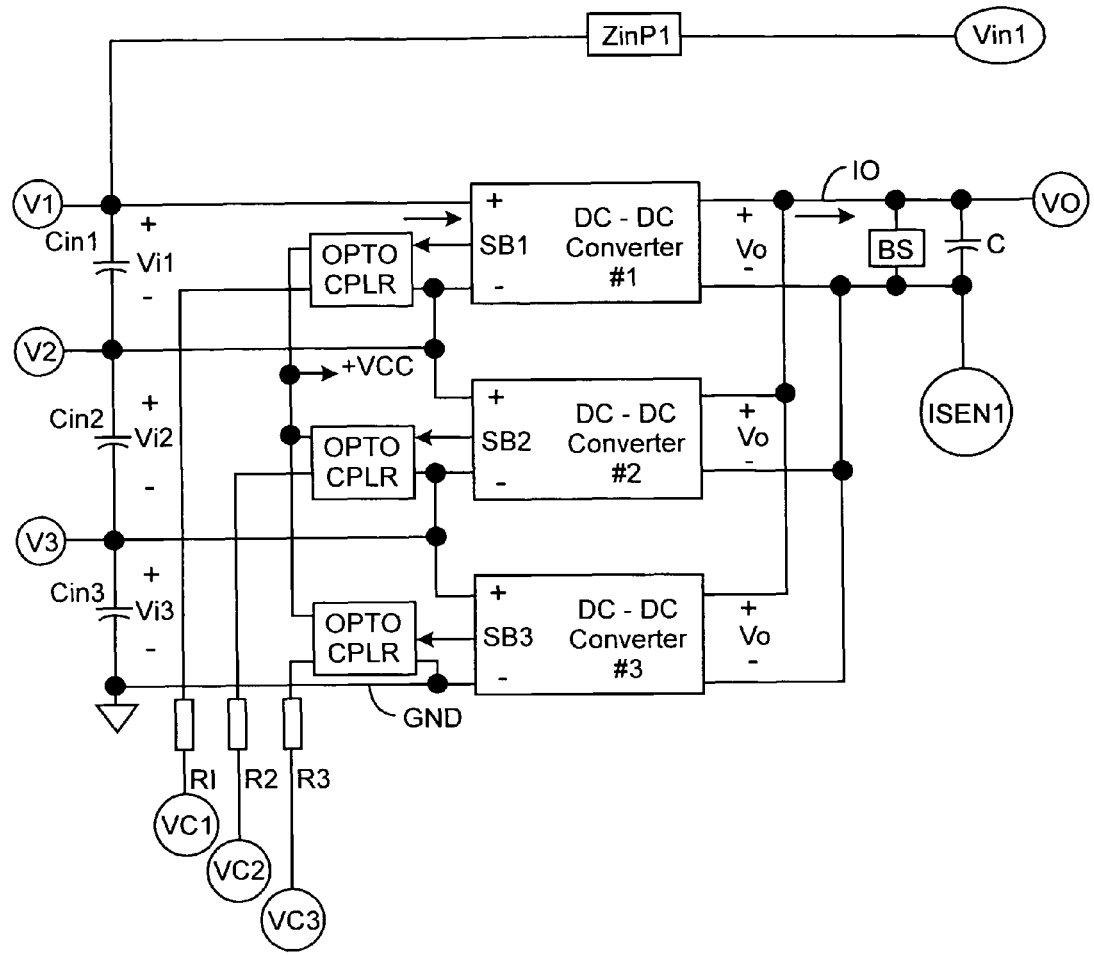
FIG. 2 is a block diagram of a prior art serial-input connected parallel-output connected converter power system.
Figure 3A:
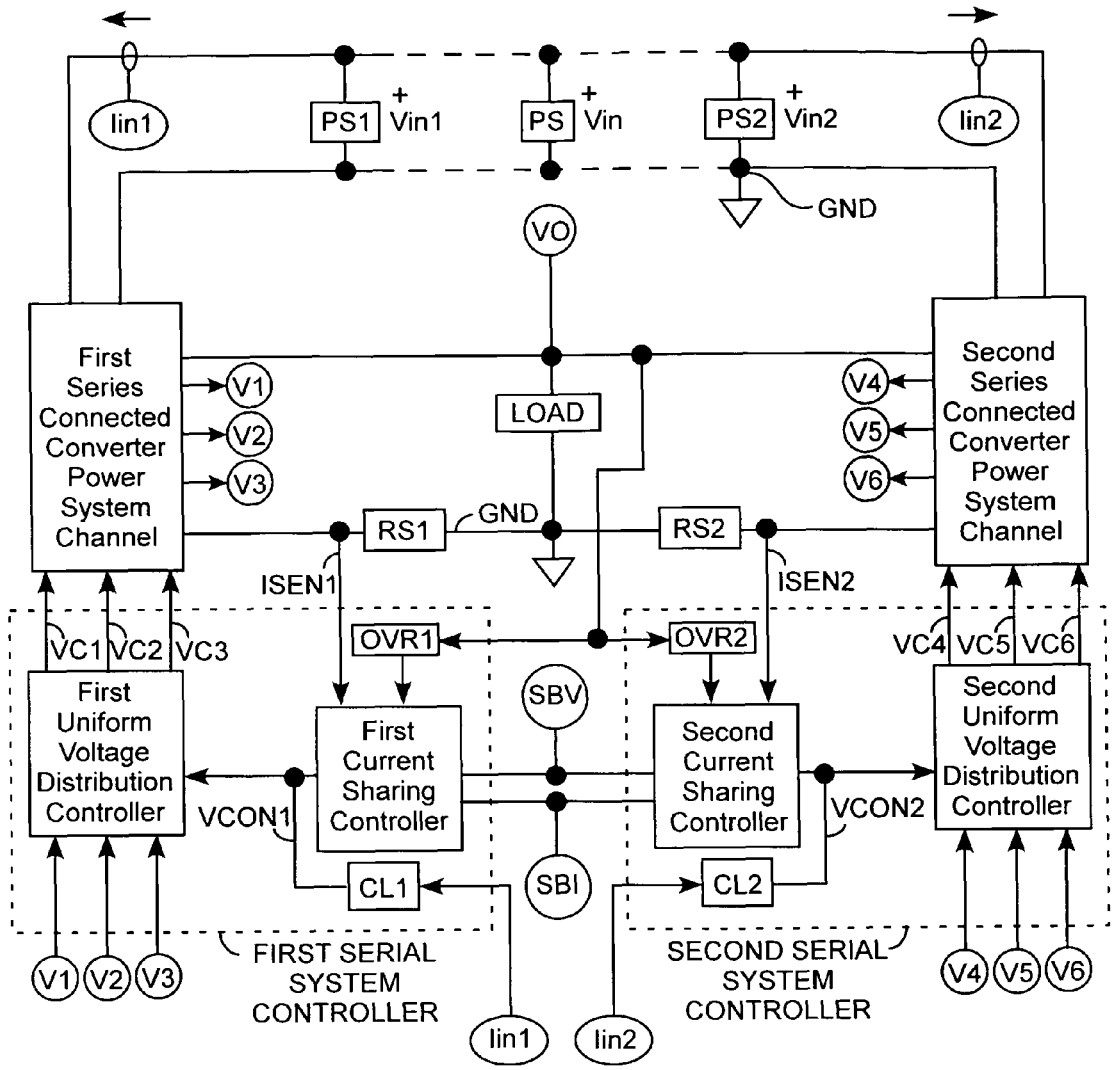
FIG. 3A is a block diagram of a series connected converter uniform output current sharing channelized uniform power distribution system.

An embodiment of the invention is described with reference to the figures using reference designations as shown in the figures. Referring to FIG. 3A, a series connected converter uniform output current sharing channelized uniform power distribution system includes channels, such as, a first series connected converter power system channel and a second series connected converter power system channel, that are respectively connected to a first serial system controller and a second serial system controller. An input power is sourced by a power supply PS having an input voltage Vin that is connected to the first and the second serial channels. The power supply PS can be respective power supplies such as PS1 and PS2 respectively providing input currents and sensors Iin1 and Iin2 to the serial channels. Input current sense signals Iin1 and Iin2 are respectively communicated to the first and second serial system controllers. The serial channels include converters, not shown, that are preferably serial-input connected and serial-output connected converters respectively providing output voltages, such as V1, V2, and V3 for the first serial channel and V4, V5, and V6 for the second serial channel. The first and second serial channels have a common output voltage V0 that drives a load connected to ground GND. The output voltage V0 is communicated to the first and second serial system controllers. Each of the serial channels may contain converters being configured as a series-connected input parallel-connected output converter bank or a parallel-connected input series-connected output converter bank.

As an example of a two-channel power system with three series-connected converters in each channel, the first serial channel converter output voltages V1, V2, and V3 are communicated to the first serial system controller. The second serial channel converter output voltages V3, V4, and V5 are communicated to the second serial system controller. Output current of the first serial channel is sensed by a first sense resistor RS1 providing a first current sense signal ISEN1 to the first serial system controller. Output current of the second serial channel is likewise sensed by a second sense resistor RS2 providing a second current sense signal ISEN2 to the second serial system controller.

The first serial system controller includes a first uniform voltage distribution controller, a first output voltage regulator OVR1, a first current limiter CL1, and a first current sharing controller. The second serial system controller includes a second uniform voltage distribution controller, a second output voltage regulator OVR2, a second current limiter CL2, and a second current sharing controller. As such, the first and second serial system controllers receive a common output voltage V0, input current sense signals Iin1 and Iin2, or a common Iin current signal, receive output current sense signals ISEN1 and ISEN2, and receive the converter serial voltages, V1, V2, V3, V4, V5, and V6 while providing respective voltage control signals VC1, VC2, VC3 to the converters of the first serial channel and voltage control signals VC4, VC5, VC6 to the converters of the second serial channel. The first and second serial system controllers have an interconnecting shared bus voltage signal SBV and an interconnecting shared bus current signal SBI. The first and second serial system controllers receive the serial voltages V1, V2, V3, V4, V5, and V6, receive the input currents Iin1 and Iin2, receive output current sense signals ISEN1 and ISEN2, and receive the output voltage V0 for providing voltage control signals VC1, VC2, VC3, VC4, VC5, and VC6 for controlling the converters of the serial channels for uniformly distributing power among the serial channels and among the converters within each channel.

Figure 3B:
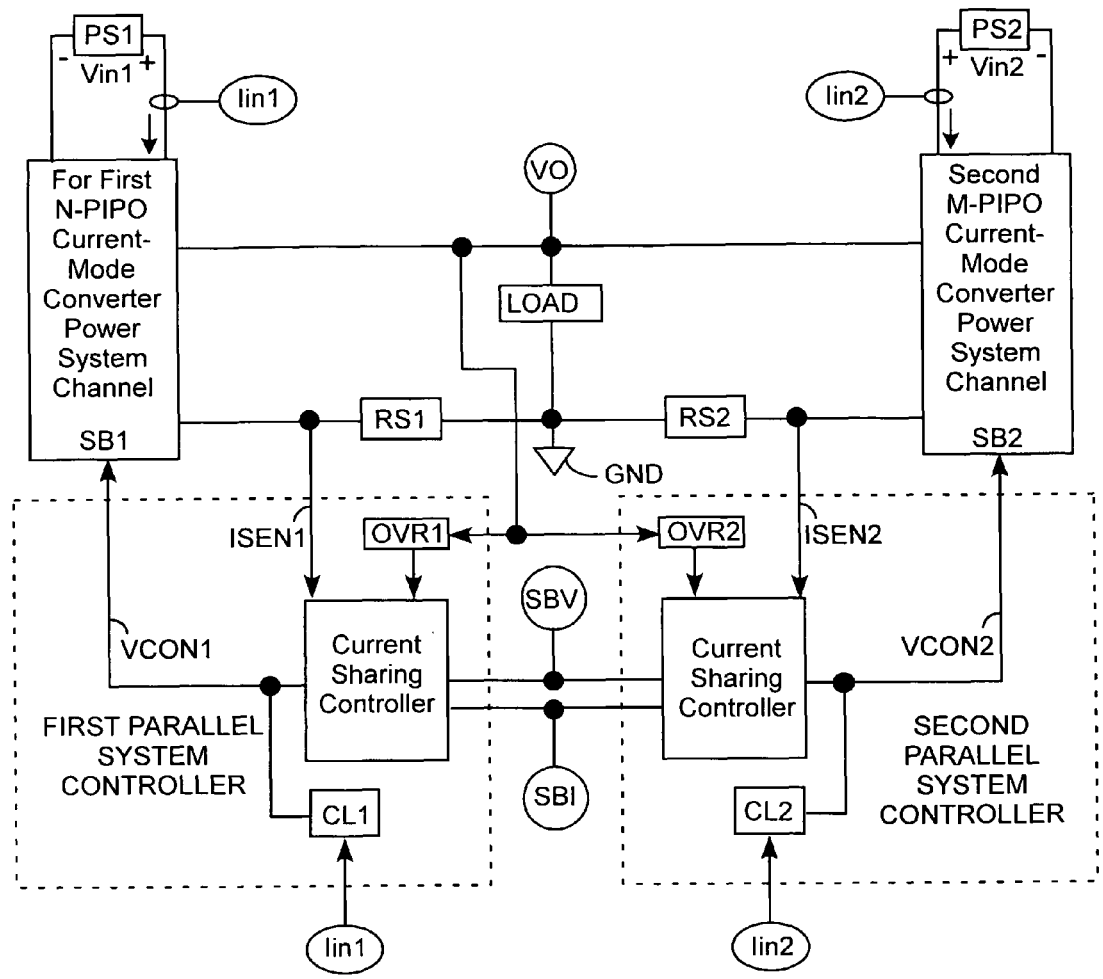
FIG. 3B is a parallel connected current mode converter uniform output current sharing channelized uniform power distribution system.

Referring to FIG. 3b, a parallel connected current mode converter uniform output current sharing channelized uniform power distribution system includes first and second parallel channels that are preferably first N-PIPO and second M-PIPO parallel-input connected and parallel-output connected current mode system channels, comprising N and M converters, respectively. Each of the parallel channels are independently connected to respective power sources PS1 and PS2 providing Iin1 and Iin2 currents to the first and second parallel channels connected to respective first and second parallel system controllers.

Input power is sourced by power supplies PS1 and PS2 having an input voltage Vin1 and Vin2 that are respectively connected to the first and the second parallel channels. The respective power supplies PS1 and PS2 respectively provide input current sense signals Iin1 and Iin2 to the first and second parallel channels. Input current sense signals Iin1 and Iin2 are respectively communicated to the first and second parallel system controllers. The first and second parallel channels include converters, not shown, that are preferably parallel-input connected and parallel-output connected converters respectively providing the output voltage V0. The first and second parallel channels have a common output voltage V0 that drives a load connected to ground GND. The output voltage V0 is communicated to the first and second parallel system controllers. Each of the first and second parallel channels have a common shared bus signal for concurrently controlling all of the converters concurrently with a signal voltage control signal VCON1 and VCON2.

Output current of the first parallel channel is sensed by a first sense resistor RS1 providing a first current sense signal ISEN1 to the first parallel system controller. Output current of the second parallel channel is likewise sensed by a second sense resistor RS2 providing a second current sense signal ISEN2 to the second parallel system controller. The first parallel system controller includes a first output voltage regulator OVR1, a first current limiter CL1, and a first current sharing controller. The second parallel system controller includes a second output voltage regulator OVR2, a second current limiter CL2, and a second current sharing controller. As such, the first and second parallel system controllers receive a common output voltage V0, input current sense signals Iin1 and Iin2, or a common Iin current signal, and receive output current sense signals ISEN1 and ISEN2, while providing respective voltage control signal VCON1 to the first parallel channels and voltage control signal VCON2 to the converters of the second parallel channel. The parallel system controllers have an interconnecting shared bus voltage signal SBV and an interconnecting shared bus current signal SBI. The parallel system controllers receive the output voltage V0, receive the input currents Iin1 and Iin2, receive output current sense signals ISEN1 and ISEN2, and receive the output voltage V0 for providing voltage control signals VCON1 and VCON2 for controlling the converters of the first and second parallel channels for uniformly distributing power among the parallel channels and among the converters within each channel.

Figure 4:
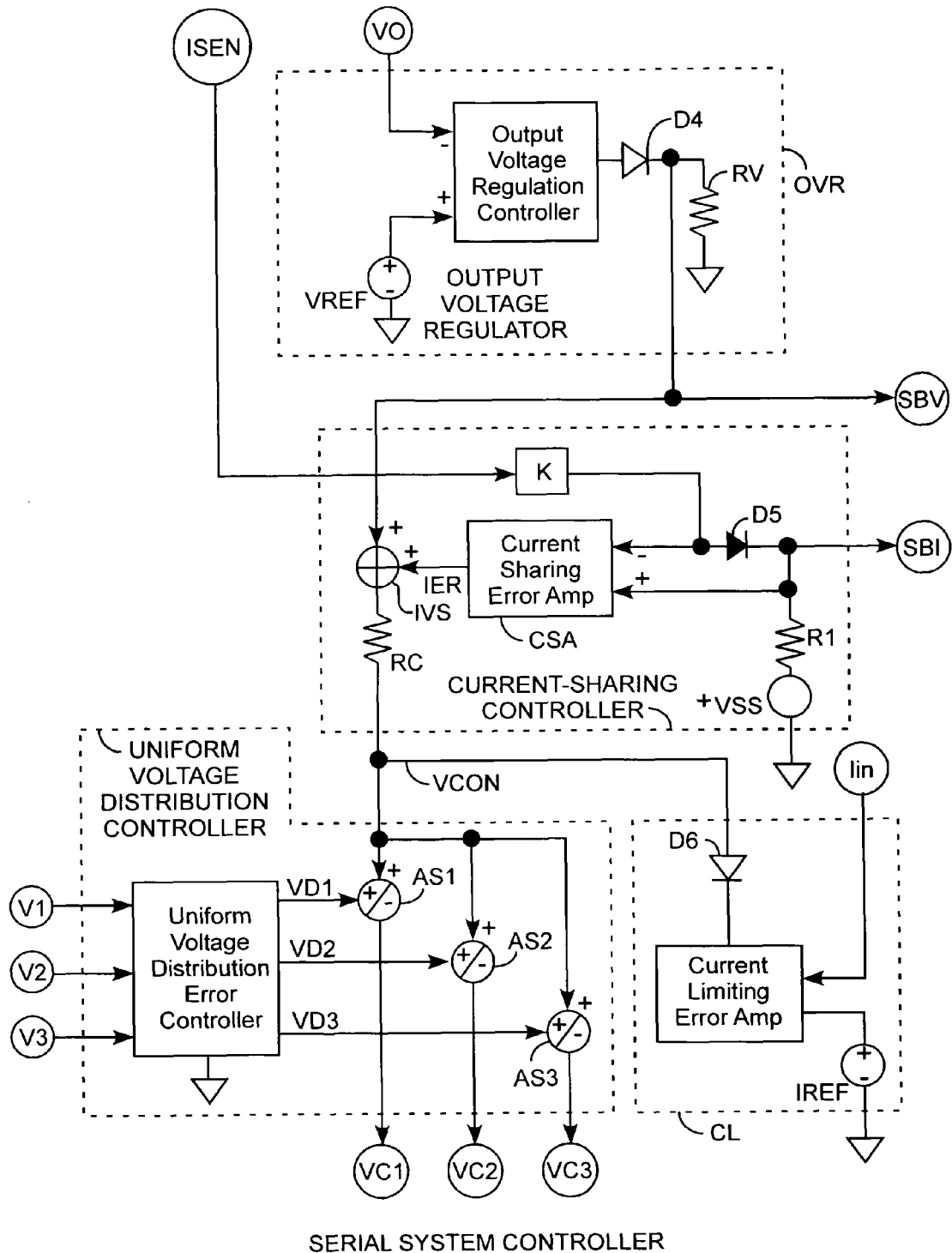
FIG. 4 is a block diagram of a system controller.

Referring all of the Figures, and more particularly to FIG. 4, a serial system controller includes an output voltage regulator OVR, a current sharing controller, a current limiter CL, and a uniform voltage distribution controller. The output voltage regulator OVR is conventional having a reference voltage VREF that is compared to the output voltage V0 using an output voltage regulation controller providing a voltage error signal to a blocking diode D4 with a voltage resistor RV connected between its cathode and the ground for providing the share bus voltage signal SBV. Of course, an alternative configuration would have the blocking diode placed in a reversed direction with the resistor RV connected between its anode and a +VCC power supply. The current limiter CL is conventional having a reference current IREF that is compared to the sensed input current Iin for providing a current error signal through a blocking diode D6 that is connected to a master voltage control signal VCON.

For each serial channel, such as the first serial channel shown in FIG. 3A, the uniform voltage distribution controller includes a conventional uniform voltage distribution error controller that receives serial converter voltages V1, V2, and V3 for providing distribution voltage signals VD1, VD2, and VD3, which are in turn respectively fed to summers AS1, AS2, and AS3, which further receive the master voltage control signal VCON for providing the control voltages VC1, VC2, and VC3. For a parallel-input parallel-output converter channel, it is connected to and controlled by a parallel system controller, which is preferably the same as the serial system controller, but without the uniform voltage distribution controller just providing the master voltage control signal VCON. The system controller further includes a current sharing controller that includes a scalar K for scaling the output current sense signal ISEN into a scaled output current signal to a current sharing error amplifier also receiving the shared bus current signal SBI for providing a current error signal IER. An ideal diode D5 that can be implemented by interconnecting at least an OP-AMP, a diode, and a resistor together provides a dominant signal being selected among scaled output current signals of all channels and broadcasts the dominant signal onto the current shared bus node SBI. The current error signal IER is summed by a current and voltage summer IVS for providing a shared error signal through a current sharing resistor RC to the master voltage control signal VCON. In this way, the system controller can utilize the shared bus voltage signal SBV and the shared bus current signal SBI to provide a stiff regulation of the load voltage while maintaining uniform distribution among the output currents of all the paralleled channels.

Depending on the orientation of the ideal diode D5, the dominant signal being broadcasted at SBI node can be either the maximum or the minimum voltage that belongs to a scaled output current signal of a channel. For the maximum voltage of a scaled current signal to be broadcasted on the SBI signal node, the cathode of the ideal diode is connected to SBI with a current-share resistor R1 terminated between SBI node and ground. For the minimum voltage of a scaled current signal to be broadcasted on the SBI signal, the anode of the ideal diode is connected to SBI with a current-share resistor R1 terminated between SBI signal and a positive bias voltage +Vss. Furthermore, the ideal diode D5 can be replaced with a resistor with the current-share resistor R1 being removed from and not connected to the SBI signal, providing an alternative current share bus signal as a central-limit voltage at the SBI node. The central-limit voltage at the SBI node is simply the mean value of all the scaled current signals of all paralleled channels.

The system output voltage VO is actively regulated by a dominant output voltage regulation feedback control loop for each channel. The output current sensing resistors RS1 and RS2 provide two respective channel output current sensed signals ISEN1 and ISEN2 allowing active current sharing control. The current sharing control is fully active when the system output voltage is regulated. When at least one power channel detects an input over current condition, the respective current limiter CL provides an active pull down to the channel control signal VCON1 for the first power channel or VCON2 for the second power channel and subsequently takes over the normal current sharing control that is active during typical output voltage regulation. For N power channels, when one series connected channel operates in a current limiting mode, the remaining non-current-limiting power channels may operate in an output voltage regulation mode with active current sharing. Under an output overload condition happening to a two-channel series-connected converter power system, it is possible that both serial channels operate in current limiting mode for controlling the power component stresses within an acceptable range.

Each channel of the series connected converters may be connected in either a series input parallel-output (SIPO) configuration, or a parallel-input series output (PISO) configuration. The SIPO and PISO systems are not limited to only three series connected converters but also applicable to more than three series connected converters as well. More than two channels of series connected converters are also applicable for providing uniform channel output current sharing among those paralleled power channels that are supplied by either a single power source or more than two distributed power sources.

The output rectification in the output voltage regulator OVR accommodates the highest control voltage at the shared bus voltage terminal SBV when more than one of the channels are connected to the same output load. This causes the voltage at the SBV terminal to be a dominant control voltage naturally selected from one of the OVR controllers that has the highest internal reference voltage VREF. Consequently, only one regulator OVR actively regulates the system output voltage V0 thereby avoiding control conflicts created by other remaining output voltage regulators OVRs that may have different internal reference voltages VREF.

This dominant shared bus control voltage SBV ensures that the frequency response of the regulator loop gain has much less variation from light load to full load because only one dominant feedback path always exists. The current sharing among different output currents utilizes the shared bus current signal at SBI terminal, at which the voltage serves as the commanding current-sharing reference for controlling output currents of all channels to achieve uniform distribution. Each PIPO parallel channel that has paralleled converters achieves uniform sharing of the converter output currents within the same channel. The uniform output current sharing among multiple channels of PIPO converters requires extra current sharing control. Because there is no series connected voltages to be controlled in the PIPO channel, all the necessary control features are still applicable except the voltage distribution controller that is not used for this simpler configuration.

Typically, the main output voltage regulation controller regulates the system output voltage V0 to a fixed value. During normal loading, the main output voltage regulation controller produces the signal VCON to regulate the output voltage. During overload, the system input current IIN is clamped to a value corresponding to the current limiting threshold reference IREF within the current limiting controller. The output of the current limiting controller, when active, seizes control over system output voltage regulation by suppressing the primary control signal VC through the pull down diode D6. During both the output voltage regulation and the input current limiting mode of operation, the serial controller produces secondary control signals VD1, VD2, and VD3. For the SIPO channel configuration, the secondary control signals are subtracted from the primary control voltage VCON to create the control voltages VC1, VC2, and VC3 that regulates the respective converters to accomplish uniform input voltage distribution. For the PISO converter configuration, the secondary control signals are added to the primary control voltage instead to achieve uniform output voltage distribution.

The channelized power system can be used in telecommunication power systems, computer power systems, satellite power systems having different voltage requirements, stacked converters for lower voltages, terrestrial energy renewable power systems, expandable battery chargers, recycled energy power supplies for energy efficient burn-in testing facilities, battery discharger power supplies for uniform voltage equalization among series connected battery cells, and solar array voltage equalizer among series connected solar array panels that have nearly the same peak power voltage but different peak power ratings. Those skilled in the art can make enhancements, improvements, and modifications to the invention, and these enhancements, improvements, and modifications may nonetheless fall within the spirit and scope of the following claims.

What is claimed is:

1. A power system for providing uniform power sharing, the system receiving an input source voltage and an input source current for an input power source and providing an output load current and an output load voltage to a load, the power system comprising,
    channels for receiving the input source voltage and the input source current and providing the output load voltage and output load current, each of the channels comprising converters, the channels providing respective output channel currents, the output channel currents sum to equal the output load current, the channels providing respective output channel voltages connected together for providing the output load voltage, and
    controllers for each of the channels, the controllers are interconnected by a shared bus current signal and a share bus voltage signal, controllers providing voltage control signals to the channels, the controllers controlling the channels for uniform power sharing among the channels with each of the channels providing the same amount output channel power to the load.

2. The power system of claim 1, wherein,
    the input power source is a plurality of input power sources respectively connected to each of the channels.

3. The power system of claim 1 wherein,
    the channels are defined by the input and output connection of the converters, and
    the channels are selected from the group consisting of parallel-input serial-output converters, serial-input parallel-output converters, and parallel-input parallel-output converters,
    converters have shared bus inputs for receiving the voltage control signals.

4. The power system of claim 1, wherein,
    the share bus voltage signal controls the output channel voltages of the channels to a same output load voltage,
    the share bus current signal controls the output channel currents of the channels to a same output current level, and
    the voltage control signals to the channels control the amount of the output channel voltage and output channel current.

5. The power system of claim 1, wherein,
    the controllers receive the output load voltage for output voltage regulation of the output load voltage.

6. The power system of claim 1 wherein,
    each of the controllers receives an input current signal of the input source current for over current limiting of the input source current and the output load current.

7. The power system of claim 1 wherein,
    the controllers receive output channel current signals for controlling the voltage control signals.

8. The power system of claim 1 wherein,
    the channels provide the converter output voltages from the converters,
    the controllers receive the converter output voltages for determining the voltage control signals, and
    the converter output voltage are connected as serial-output voltages.

9. The power system of claim 1 wherein,
    the channels provide converter input voltages from each of the converters,
    the controllers receive the converter input voltages for controlling the voltage control signals, and
    the converter input voltages are connected as serial-input voltages.

10. The power system of claim 1 wherein.
    the channels have an unequal numbers of converters.

11. The power system of claim 1 wherein.
    each of the channels has an equal number of converters.

12. The power system of claim 1 wherein,
    each of the channels comprises serial-input parallel-output connected converters,
    each of the channels has an unequal number of converters, and
    the input voltage source is a plurality of input voltage sources respectively connected to the channels.

13. The power system of claim 1 wherein,
    each of the channels comprises parallel-input serial-output connected converters,
    each of the channels has an unequal number of converters, and
    the input voltage source is a plurality of input voltage sources respectively connected to the channels.

14. The power system of claim 1 wherein,
    each of the channels comprises parallel-input parallel-output connected converters,
    each of the channels has an unequal number of converters, and
    the input voltage source is a plurality of input voltage sources respectively connected to the channels.

15. The power system of claim 1 wherein,
    the input power source is selected from the group consisting of a solar power source, a battery, a DC voltage source, and a DC current source.

16. The power system of claim 1 wherein,
one of the channels comprises parallel-input parallel-output connected converters, and
the parallel-input parallel-output connected converters have a common share bus signal for controlling all of the parallel-input parallel-output connected converters to a same converter output voltage.

17. The power system of claim 1 wherein,
a number of voltage control signals of one of the channels is equal to the number of converters of the one channel, and
the one of the channels comprises converters selected from the group consisting of serial-input parallel-output connected converters and parallel-input and serial-output connected converters.

18. The power system of claim 1 wherein,
the controllers are integrated as a signal system controller internally having the shared bus current signal and the share bus voltage signal and singularly providing the voltage control signals to the channels.

* * * * *